United States Patent
Sabnis

(10) Patent No.: US 10,060,391 B2
(45) Date of Patent: *Aug. 28, 2018

(54) THRUST EFFICIENT TURBOFAN ENGINE

(71) Applicant: United Technologies Corporation, Farmington, CT (US)

(72) Inventor: Jayant Sabnis, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,557

(22) Filed: Mar. 6, 2017

(65) Prior Publication Data

US 2017/0306886 A1  Oct. 26, 2017

Related U.S. Application Data

(63) Continuation of application No. 14/497,822, filed on Sep. 26, 2014, which is a continuation-in-part of
(Continued)

(51) Int. Cl.
*F02K 3/075* (2006.01)
*F02K 3/06* (2006.01)
(Continued)

(52) U.S. Cl.
CPC .............. *F02K 3/075* (2013.01); *B64D 27/10* (2013.01); *F01D 5/06* (2013.01); *F01D 15/12* (2013.01);
(Continued)

(58) Field of Classification Search
CPC ...... F02C 6/02; F02C 3/04; F02C 3/06; F02C 3/08; F02C 7/36; F02K 1/52; F02K 3/075; F02K 3/06
See application file for complete search history.

(56) References Cited

U.S. PATENT DOCUMENTS 2,258,792 A  4/1941  New
2,748,623 A  6/1956  Hill
(Continued)

FOREIGN PATENT DOCUMENTS

EP  0791383  8/1997
EP  1142850  10/2001
(Continued)

OTHER PUBLICATIONS

Article—"Gears Put a New Spin on Turbofan Performance," printed from MachineDesign.com website.
(Continued)

*Primary Examiner* — Craig Kim
(74) *Attorney, Agent, or Firm* — Carlson, Gaskey & Olds, P.C.

(57) ABSTRACT

A disclosed turbofan engine includes a gas generator section for generating a gas stream flow. A speed reduction device is driven by the power turbine. A propulsor section includes a fan driven by the power turbine through the speed reduction device at a second speed lower than the first speed for generating propulsive thrust as a mass flow rate of air through a bypass flow path. The fan includes a tip diameter greater than forty-five (45) inches and an Engine Unit Thrust Parameter ("EUTP") defined as net engine thrust divided by a product of the mass flow rate of air through the bypass flow path, a tip diameter of the fan and the first rotational speed of the power turbine for cruise, climb and sea level take-off power conditions.

26 Claims, 2 Drawing Sheets

Related U.S. Application Data application No. 13/854,225, filed on Apr. 1, 2013, now Pat. No. 9,624,827.

(60) Provisional application No. 61/787,321, filed on Mar. 15, 2013, provisional application No. 61/884,327, filed on Sep. 30, 2013.

(51) Int. Cl.
    *F01D 5/06*     (2006.01)
    *F01D 15/12*     (2006.01)
    *B64D 27/10*     (2006.01)
    *F02C 3/107*     (2006.01)
    *F04D 29/32*     (2006.01)
    *F04D 19/02*     (2006.01)

(52) U.S. Cl.
    CPC ............... *F02C 3/107* (2013.01); *F02K 3/06* (2013.01); *F04D 19/02* (2013.01); *F04D 29/325* (2013.01); *F05D 2220/323* (2013.01); *F05D 2240/35* (2013.01)

(56) References Cited

U.S. PATENT DOCUMENTS

| | | |
|---|---|---|
| 2,936,655 A | 5/1960 | Peterson et al. |
| 3,021,731 A | 2/1962 | Stoeckicht |
| 3,033,002 A | 5/1962 | Davis |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,526,092 A | 9/1970 | Steel |
| 3,729,957 A | 5/1973 | Petrie et al. |
| 3,747,343 A | 7/1973 | Rosen |
| 3,754,484 A | 8/1973 | Roberts |
| 3,820,719 A | 6/1974 | Clark |
| 3,861,139 A | 1/1975 | Jones |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,446,696 A | 5/1984 | Sargisson et al. |
| 4,463,553 A | 8/1984 | Boudigues |
| 4,478,551 A | 10/1984 | Honeycutt, Jr. et al. |
| 4,649,114 A | 3/1987 | Miltenburger et al. |
| 4,696,156 A | 9/1987 | Burr et al. |
| 4,809,498 A | 3/1989 | Giffin, III et al. |
| 4,827,712 A | 5/1989 | Coplin |
| 4,979,362 A | 12/1990 | Vershure, Jr. |
| 5,010,729 A | 4/1991 | Adamson et al. |
| 5,074,109 A | 12/1991 | Mandet et al. |
| 5,102,379 A | 4/1992 | Pagluica et al. |
| 5,141,400 A | 8/1992 | Murphy et al. |
| 5,307,622 A | 5/1994 | Ciokajlo et al. |
| 5,317,877 A | 6/1994 | Stuart |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,378,308 B1 | 4/2002 | Pfluger |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,619,030 B1 | 9/2003 | Seda et al. |
| 6,669,393 B2 | 12/2003 | Schilling |
| 6,708,482 B2 | 3/2004 | Seda |
| 6,709,492 B1 | 3/2004 | Spadaccini et al. |
| 6,732,502 B2 | 5/2004 | Seda et al. |
| 6,814,541 B2 | 11/2004 | Evans et al. |
| 7,021,042 B2 | 4/2006 | Law |
| 7,328,580 B2 | 2/2008 | Lee et al. |
| 7,374,403 B2 | 5/2008 | Decker et al. |
| 7,409,819 B2 | 8/2008 | Henry |
| 7,513,103 B2 | 4/2009 | Orlando et al. |
| 7,591,754 B2 | 9/2009 | Duong et al. |
| 7,594,404 B2 | 9/2009 | Somanath et al. |
| 7,600,370 B2 | 10/2009 | Dawson |
| 7,685,808 B2 | 3/2010 | Orlando et al. |
| 7,694,505 B2 | 4/2010 | Schilling |
| 7,716,914 B2 | 5/2010 | Schilling |
| 7,721,549 B2 | 5/2010 | Baran |
| 7,806,651 B2 | 10/2010 | Kennepohl et al. |
| 7,824,305 B2 | 11/2010 | Duong et al. |
| 7,832,193 B2 | 11/2010 | Orlando et al. |
| 7,882,693 B2 | 2/2011 | Schilling |
| 7,926,260 B2 | 4/2011 | Sheridan et al. |
| 7,997,868 B1 | 8/2011 | Liang et al. |
| 8,002,520 B2 | 8/2011 | Dawson et al. |
| 8,015,828 B2 | 9/2011 | Moniz et al. |
| 8,061,969 B2 | 11/2011 | Durocher et al. |
| 8,091,371 B2 | 1/2012 | Durocher et al. |
| 8,191,352 B2 | 6/2012 | Schilling |
| 8,205,432 B2 | 6/2012 | Sheridan |
| 8,333,554 B2 | 12/2012 | Chaudhry |
| 8,529,197 B1 | 9/2013 | Coffin et al. |
| 2003/0163984 A1 | 9/2003 | Seda et al. |
| 2006/0130456 A1 | 6/2006 | Suciu et al. |
| 2006/0185346 A1 | 8/2006 | Rolt |
| 2006/0288686 A1 | 12/2006 | Cherry et al. |
| 2008/0003096 A1 | 1/2008 | Kohli et al. |
| 2008/0098718 A1 | 5/2008 | Henry et al. |
| 2008/0148881 A1 | 6/2008 | Moniz et al. |
| 2008/0317588 A1 | 12/2008 | Grabowski et al. |
| 2009/0056343 A1 | 3/2009 | Suciu et al. |
| 2009/0097967 A1 | 4/2009 | Smith et al. |
| 2009/0229242 A1 | 9/2009 | Schwark |
| 2010/0080700 A1 | 4/2010 | Venter |
| 2010/0132376 A1 | 6/2010 | Durocher et al. |
| 2010/0148396 A1 | 6/2010 | Xie et al. |
| 2010/0218483 A1 | 9/2010 | Smith |
| 2010/0326050 A1 | 12/2010 | Schilling et al. |
| 2010/0331139 A1 | 12/2010 | McCune |
| 2011/0159797 A1 | 6/2011 | Beltman et al. |
| 2011/0289900 A1 | 12/2011 | Stern |
| 2011/0293423 A1 | 12/2011 | Bunker et al. |
| 2012/0124964 A1 | 5/2012 | Hasel et al. |
| 2012/0171018 A1 | 7/2012 | Hasel et al. |
| 2013/0000314 A1 | 1/2013 | McCaffrey |
| 2013/0008146 A1 | 1/2013 | Gallagher et al. |

FOREIGN PATENT DOCUMENTS

| | | |
|---|---|---|
| GB | 1211064 | 11/1970 |
| GB | 1516041 | 6/1978 |
| GB | 2041090 | 9/1980 |
| GB | 2426792 | 12/2006 |
| WO | 2007038674 | 4/2007 |

OTHER PUBLICATIONS

Article—"Gas Power Cycle—Jet Propulsion Technology, a Case Study," from MachineDesign.com website.
Jane's Aero-Engines, Issue Seven, Copyright 2000, pp. 510-512.
Kandebo, "Geared-Turbofan Engine Design Targets Cost, Complexity", Aviation Week & Space Technology, New York, Feb. 23, 1998.
Mattingly et al., Aircraft Engine Design, 2002, American Institute of Aeronautics and Astronautics, 2nd Edition, p. 292.
Nagendra, "Optimal rapid multidisciplinary response networks: RAPIDDISK", 2005, Stuct Multidisc Optim 29, 213-231.
Ciepluch et al., "Quiet, Powered-Lift Propulsion", NASA Conference Publication 2077, Nov. 14-15, 1978.

(56) References Cited

OTHER PUBLICATIONS

Guha, "Optimal Fan Pressure Ratio for Bypass Engines with Separate or Mixed Exhaust Streams", 2001, Journal of Propulsion and Power, vol. 17, No. 5, Sep.-Oct.
http://www.gereports.com/ges-breakthrough-genx-debuts-at-the-paris-air-show, dated Jun. 15, 2009 and viewed Jan. 23, 2012.
http://www.geaviation.com/engines/commerical/genx/2b_fett.html viewed Jan. 28, 2012.
Civil Turbojet/Turbofan Specifications, Jet Engine Specification Database (Apr. 3, 2005).
International Search Report & Written Opinion for International Application No. PCT/US2014/027105 dated Dec. 22, 2014.
International Search Report & Written Opinion for International Application No. PCT/US2014/057745 dated Dec. 30, 2014.
International Preliminary Report on Patentability for International Application No. PCT/US2014/027105 dated Sep. 24, 2015.
International Preliminary Report on Patentability for International Application No. PCT/US2014/057745 dated Apr. 14, 2016.
Waters, Mark H. et al., "Analysis of Turbofan Propulsion System Weight and Dimensions" NASA Technical Memorandum, NASA TM X-73, 199, Jan. 1977.
Denos, R. et al., "Geared Fan", Aero-Engine Design: From State-Of-The-Art Turbofans Towards Innovative Architectures—Hardcover. Lectures Series Mar. 2008, Mar. 3, 2008.
Edkins, D.P. et al., "TF34 Turbofan Quiet Engine Study—Final Report", NASA CR-120914, Jan. 1, 1972.
European Search Report for EP Application No. 14807688.8 dated Oct. 18, 2016.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., Macmartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33, 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMGs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.

(56) References Cited

OTHER PUBLICATIONS

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill pp. 87-151.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Rankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review_pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, L, and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_pffe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E, Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida. pp. 145-153.
Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.
Carney, K., Pereira, M. Revilock, and Matheny, P. (2003). Jet engine fan blade containment using two alternate geometries. 4th European LS-DYNA Users Conference. pp 1-10.
Brines, G.L. (1990). The turbofan of tomorrow. Mechanical Engineering: The Journal of the American Society of Mechanical Engineers,108(8), 65-67.

(56) References Cited

OTHER PUBLICATIONS

Faghri, A. (1995). Heat pipe and science technology. Washington, D.C.: Taylor & Francis. pp. 1-60.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modem Machine Shop. Retrieved from: http://www.mmsonline.com/articles/composite-fan-blade-containment-case pp. 1-4.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979. pp. 1-348.
Horikoshi, S. and Serpone, N. (2013). Introduction to nanoparticles. Microwaves in nanoparticle synthesis. Wiley-VCH Verlag GmbH & Co. KGaA. pp. 1-24.
Kerrebrock, J.L. (1977). Aircraft engines and gas turbines. Cambridge, MA: The MIT Press. p. 11.
Xie, M. (2008). Intelligent engine systems: Smart case system. NASA/CR-2008-215233. pp. 1-31.
Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.

(56) References Cited

OTHER PUBLICATIONS

Garret TFE731 Turbofan Engine (CAT C). Chapter 79: Lubrciation System. TTFE731 Issue 2. 2010. pp. 1-24.
European Search Report for EP Application No. 14847214.5 dated Jun. 23, 2017.

THRUST EFFICIENT TURBOFAN ENGINE

REFERENCE TO RELATED APPLICATION

The present disclosure is a continuation of U.S. application Ser. No. 14/497,822 filed on Sep. 26, 2014 which claims priority to U.S. Provisional Application No. 61/884,327 filed on Sep. 30, 2013 and is a continuation-in-part of U.S. application Ser. No. 13/854,225 filed on Apr. 1, 2013, which claims priority to U.S. Provisional Application No. 61/787,321 filed on Mar. 15, 2013.

BACKGROUND

A turbofan engine typically includes a fan section, a compressor section, a combustor section and a turbine section. Air entering the compressor section is typically compressed and delivered into the combustor section where it is mixed with fuel and ignited to generate a high-pressure, high-temperature gas flow. The high-pressure, high-temperature gas flow expands through the turbine section to drive the compressor and the fan section.

A direct-drive turbofan engine typically includes a fan section directly driven by a low pressure turbine producing the power needed to drive the fan section, such that the low pressure turbine and the fan section rotate at a common rotational speed in a common direction. A power transmission device such as a gear assembly or other mechanism may be utilized to drive the fan section such that the fan section may rotate at a speed different than the turbine section so as to increase the overall efficiency of the engine. In a gear-drive turbofan engine architecture, a shaft driven by one of the turbine sections may provide an input to the speed reduction device that drives the fan section at a reduced speed such that both the turbine section and the fan section can rotate at closer to their respective optimal rotational speeds.

SUMMARY

A turbofan engine according to an exemplary embodiment of this disclosure, among other possible things includes a gas generator section for generating a gas stream flow with higher energy per unit mass flow than that contained in ambient air. A power turbine configured for converting the gas stream flow into shaft power. The power turbine configured for rotating at a first rotational speed and operating at a temperature less than about 1800° F. at a sea level takeoff power condition. A speed reduction device configured to be driven by the power turbine. A propulsor section includes a fan configured to be driven by the power turbine through the speed reduction device at a second speed lower than the first speed for generating propulsive thrust as a mass flow rate of air through a bypass flow path. The engine is configured such that when operating at the sea level takeoff power condition a bypass ratio of a first volume of air through the bypass flow path divided by a second volume of air directed into the gas generator is greater than about 10.0 and a pressure ratio across the fan is less than about 1.50.

In a further embodiment of the foregoing turbofan engine, the fan includes a tip diameter greater than about fifty (50) inches and an Engine Unit Thrust Parameter ("EUTP") defined as net engine thrust divided by a product of the mass flow rate of air through the bypass flow path, a tip diameter of the fan and the first rotational speed of the power turbine is less than about 0.30 at the sea level takeoff power condition.

In a further embodiment of the foregoing turbofan engine, the EUTP is less than about 0.25 at the takeoff condition.

In a further embodiment of any of the foregoing turbofan engines, the EUTP is less than about 0.20 at the takeoff condition.

In a further embodiment of any of the foregoing turbofan engines, the EUTP at one of a climb condition and a cruise condition is less than about 0.10.

In a further embodiment of any of the foregoing turbofan engines, the EUTP at one of a climb condition and a cruise condition is less than about 0.08.

In a further embodiment of any of the foregoing turbofan engines, the tip diameter of the fan is greater than about 50 inches and less than about 160 inches.

In a further embodiment of any of the foregoing turbofan engines, the mass flow generated by the propulsor section is between about 625 lbm/sec and about 80,000 lbm/sec.

In a further embodiment of any of the foregoing turbofan engines, the first speed of the power turbine is between about 6200 rpm and about 12,500 rpm.

In a further embodiment of any of the foregoing turbofan engines, the propulsive thrust generated by the turbofan engine is between about 16,000 lbf and about 120,000 lbf.

In a further embodiment of any of the foregoing turbofan engines, the gas generator defines an overall pressure ratio of between about 40 and about 80.

A turbofan engine according to an exemplary embodiment of this disclosure, among other possible things includes a gas generator section for generating a gas stream flow with higher energy per unit mass flow than that contained in ambient air. A power turbine for converting the gas stream flow into shaft power. The power turbine is rotatable at a first rotational speed, wherein the power turbine operates at a temperature less than about 1800° F. at a sea level takeoff power condition. A speed reduction device is configured to be driven by the power turbine. A propulsor section includes a fan configured to be driven by the power turbine through the speed reduction device at a second speed lower than the first speed for generating propulsive thrust as a mass flow rate of air through a bypass flow path. The fan includes a fan tip diameter greater than about fifty (50) inches and an Engine Unit Thrust Parameter ("EUTP") defined as net engine thrust divided by a product of the mass flow rate of air through the bypass flow path, a tip diameter of the fan and the first rotational speed of the power turbine is less than about 0.30 at the sea level takeoff power condition and or about 0.15 at one of a climb condition and a cruise condition.

In a further embodiment of the foregoing turbofan engine, the EUTP is less than about 0.125 for at least one of the climb condition and the cruise condition.

In a further embodiment of any of the foregoing turbofan engines, the EUTP at one of the climb condition and the cruise condition is less than about 0.08.

In a further embodiment of any of the foregoing turbofan engines, the EUTP at a takeoff condition is less than about 0.15.

In a further embodiment of any of the foregoing turbofan engines, the tip diameter of the fan is between about 50 inches and about 160 inches.

In a further embodiment of any of the foregoing turbofan engines, the mass flow generated by the propulsor section is between about 625 lbm/sec and about 80,000 lbm/sec.

In a further embodiment of any of the foregoing turbofan engines, the first speed of the power turbine is between about 6200 rpm and about 12,500 rpm.

In a further embodiment of any of the foregoing turbofan engines, the propulsive thrust generated by the turbofan engine is between about 16,000 lbf and about 120,000 lbf.

In a further embodiment of any of the foregoing turbofan engines, the gas generator defines an overall pressure ratio of between about 40 and about 80.

A turbofan engine according to an exemplary embodiment of this disclosure, among other possible things includes a gas generator section for generating a high energy gas stream. The gas generating section includes a compressor section, combustor section and a first turbine. A second turbine converts the high energy gas stream flow into shaft power. The second turbine rotates at a first speed and includes less than or equal to about six (6) stages. A geared architecture is driven by the second turbine. A propulsor section is driven by the second turbine through the geared architecture at a second speed lower than the first speed. The propulsor section includes a fan with a pressure ratio across the fan section less than about 1.50. The propulsor section generates propulsive thrust as a mass flow rate of air through a bypass flow path from the shaft power. The fan includes a tip diameter greater than about fifty (50) inches and an Engine Unit Thrust Parameter ("EUTP") defined as net engine thrust divided by a product of a mass flow rate of air through the bypass flow path, a tip diameter of the fan and the first rotational speed of the second turbine is less than about 0.30 at a takeoff condition.

In a further embodiment of the foregoing turbofan engine, the EUTP is less than about 0.25 at the takeoff condition.

In a further embodiment of any of the foregoing turbofan engines, the EUTP is less than about 0.20 at the takeoff condition.

In a further embodiment of any of the foregoing turbofan engines, the EUTP at one of a climb condition and a cruise condition is less than about 0.10.

In a further embodiment of any of the foregoing turbofan engines, the EUTP at the takeoff condition is less than about 0.08.

In a further embodiment of any of the foregoing turbofan engines, the fan section defines a bypass airflow having a bypass ratio greater than about ten (10).

In a further embodiment of any of the foregoing turbofan engines, the tip diameter of the fan is between about 50 inches and about 160 inches.

In a further embodiment of any of the foregoing turbofan engines, the mass flow generated by the propulsor section is between about 625 lbm/sec and about 80,000 lbm/sec.

In a further embodiment of any of the foregoing turbofan engines, the first speed of the second turbine is between about 6200 rpm and about 12,500 rpm.

In a further embodiment of any of the foregoing turbofan engines, the second turbine comprises a low pressure turbine with 3 to 6 stages.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
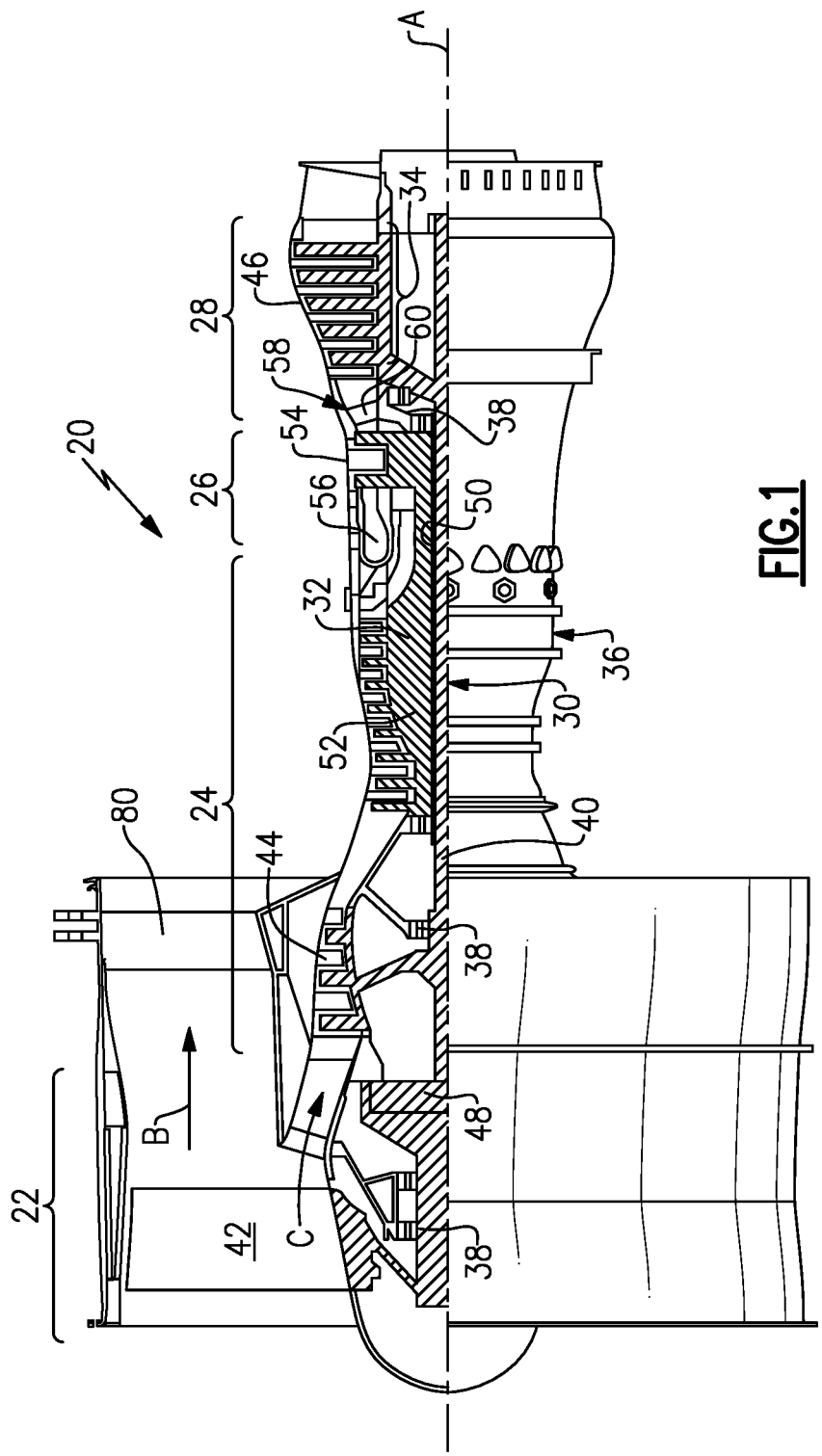
FIG. 1 is a schematic view of an example turbofan engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air through a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a speed reduction device such as a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and that the location of the bearing systems 38 may be varied as appropriate to the application.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce a gas stream with high energy that expands through the high pressure turbine 54 and low pressure turbine 46. The mid-turbine frame 58 includes vanes 60, which are in the core airflow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example speed reduction device is a geared architecture 48 however other speed reducing devices such as fluid or electromechanical devices are also within the contemplation of this disclosure. The example geared architecture 48 is an epicyclical gear train, such as a planetary gear system, star gear system or other known gear system, with a gear reduction ratio of greater than about 1.8 and, in some embodiments, greater than about 4.5.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) stages schematically indicated at 34. In another non-limiting example embodiment the low pressure turbine 46 includes about three (3) stages. A ratio between the number of fan blades 42 and the number of low pressure turbine rotors is between about 3.3 and about 8.6. The example low pressure turbine 46 provides the driving power to rotate the fan section 22 and therefore the relationship between the number of stages 34 in the low pressure turbine 46 and the number of blades 42 in the fan section 22 defines an example gas turbine engine 20 with increased power transfer efficiency.

Figure 2:
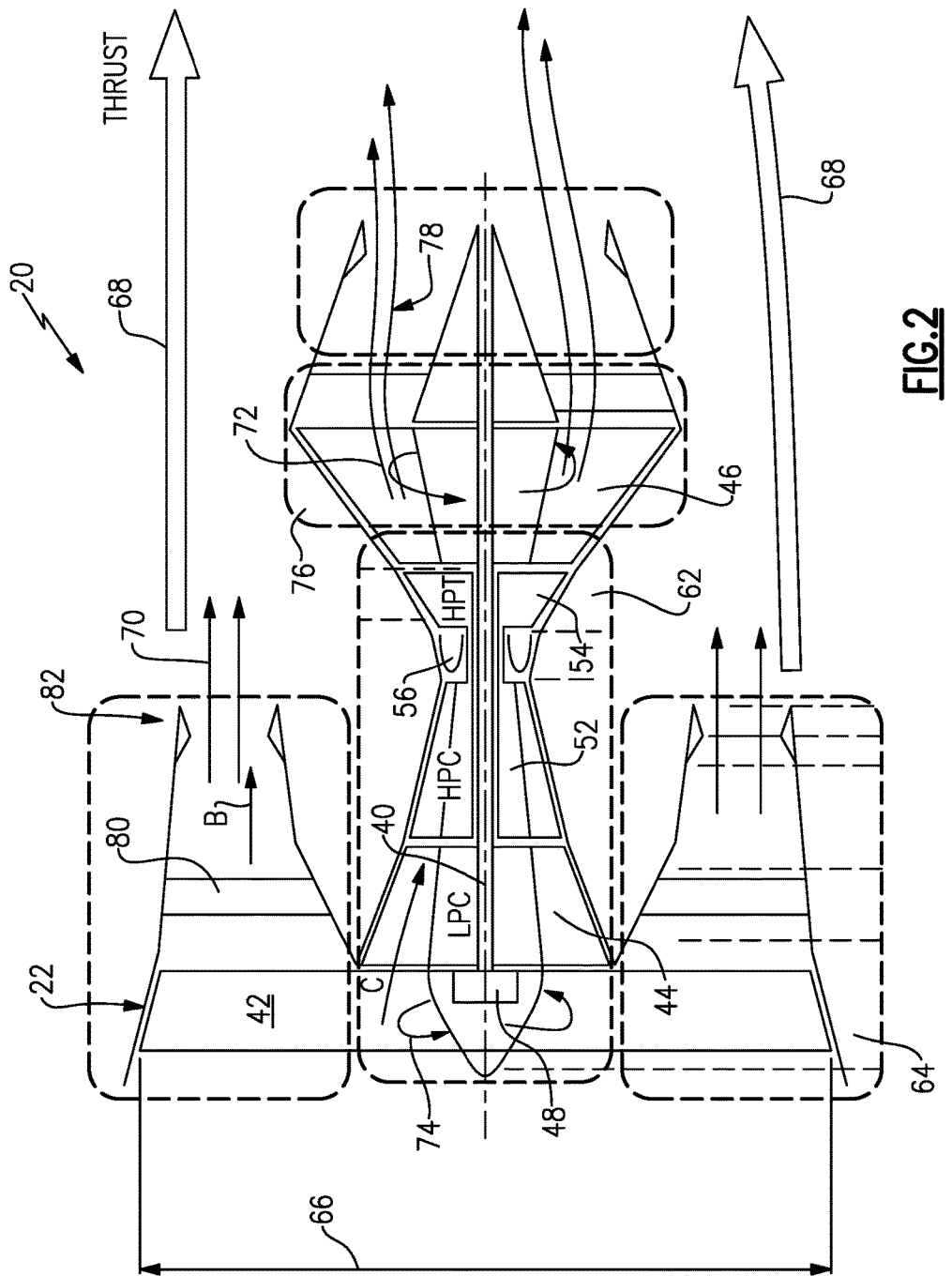
FIG. 2 is a schematic view of functional elements of the example turbofan engine.

Referring to FIG. 2, with continued reference to FIG. 1, the example turbofan engine 20 includes a gas generator section 62 for generating a high energy (per unit mass) gas stream 78. A power turbine 76 converts the high energy gas stream 78 into shaft power that drives the geared architecture 48. In one embodiment, the power turbine may be the low pressure turbine 46 that drives the inner shaft 40. The power turbine 76 drives a propulsor section 64 through the geared architecture 48. The propulsor section 64 generates a mass flow 70 of air through the bypass flow path B that is a substantial portion of the overall propulsive thrust 68 generated by the turbofan engine 20.

The gas generator section 62 includes part of the fan section compressing the air flow directed along the core flow path C, the low pressure compressor 44, the high pressure compressor 52, the combustor 56, the high pressure turbine 54 and part of the low-pressure turbine 46. The high pressure turbine 54 is the first turbine after the combustor 56 and drives the high pressure compressor 52. Disclosed example gas generators include an overall pressure ratio between entering airflow and the exiting gas stream of between about 40 and 80.

The power driving the geared architecture 48 and thereby the propulsor section 64 is provided by the power turbine 76. In this disclosure, the power turbine 76 comprises the second turbine downstream of the combustor 56 such as the low pressure turbine 46. The low pressure turbine 46 rotates at the first speed 72 and includes no more than six (6) stages 34. Moreover, the low pressure turbine 46 may include between three (3) and six (6) stages 34, inclusive.

The power or low pressure turbine 46 rotates at the first speed 72 (measured in terms of revolutions per minute) greater than a second speed 74 (also measured in terms of revolutions per minute) at which the fan section 22 rotates. In some embodiments, the first speed may be between about 6200 rpm and about 12,500 rpm. The first speed of the low pressure turbine 46 is enabled by the speed reduction provided by the geared architecture 48. At the first speed 72, each of the stages 34 are more efficient at converting energy from the gas flow 78 to power transmitted through the inner shaft 40.

The power turbine 76 operates at a more efficient speed and therefore may operate at a more efficient temperature, schematically indicated at 75, for converting energy from the gas flow 78 to power through the inner shaft 40. In one example embodiment, the power turbine 76 operates at temperatures below about 1800° F. during a sea level takeoff power condition with an ambient temperature of about 86° F. The sea level takeoff power condition, during the day and at 86° F. is a standard condition utilized to measure and compare engine performance.

In this example the power turbine temperature is determined with the engine 20 at the sea level takeoff power setting in a static uninstalled condition. The static and uninstalled condition is with the engine operating during test conditions while not subject to parasitic losses such as providing cabin bleed air to an aircraft cabin. In another example embodiment, the power turbine 76 operates at temperatures below about 1760° F. during the same seal level takeoff power condition with an ambient temperature of about 86° F. in a static uninstalled condition.

The propulsor section 64 includes the fan section with fan blades 42 that rotate about the engine axis A. The fan blades 42 extend radially outward to define a tip diameter 66 between tips of opposing blades 42. The disclosed fan section 22 includes a tip diameter 66 that, in some embodiments, may be between about 45 inches (114 cm) and about 160 inches (406 cm). In another example embodiment, the tip diameter 66 is between about 50 inches (127 cm) and about 85 inches (215.9 cm). The tip diameter of the fan section 22 enables the desired fan pressure ratio in combination with the second rotational speed 74 provided by the gear reduction of the geared architecture 48.

The propulsor section 64 includes the fan section 22, and also includes the fan exit guide vanes 80 and typically a fan nozzle 82. The fan section 22 is rotated at the second speed 74 by the geared architecture 48 at a speed determined to enable the generation of the mass flow 70 through the bypass flow path B. The pressure ratio across the fan section enables the efficient transformation of the shaft power provided in the power turbine 76 to propulsive thrust.

Fan pressure ratios below about 1.5, and better below 1.45 enable desirable generation of thrust. The desired fan pressure ratio can be obtained utilizing a combination of fan exit guide vanes 80 and the fan nozzle 82 that cooperate with the fan section 22 to enable fan pressure ratios of less than 1.45. The mass flow 70 produced by the example propulsor section 64 may, in some embodiments, be between about 625 lbm/sec (283 kg/sec) and about 80,000 lbm/sec (36,287 kg/sec). The mass flow of air 70 through the bypass flow path B combines with thrust generated by gas flow 78 to provide the overall engine thrust 68. However, a majority of engine thrust is provided by the mass flow of air 70 generated by the propulsor section 64.

The overall efficiency of the turbofan engine 20 is a combination of how well each of the sections 62, 76 and 64 converts input energy into the desired output. The gas generator section 62 transforms energy from the air/fuel mixture ignited in the combustor 56 into the high-energy gas stream 78. The power turbine 46 converts energy from the gas stream 78 into shaft power rotating the inner shaft 40 at a first speed 72 to drive the propulsor 64. The propulsor section 64 generates the mass flow of air 70 through bypass flow path B that provides the propulsive thrust 68.

The thrust generation efficiency of the engine is related to the Engine Unit Thrust Parameter ("EUTP"), which is defined as the net thrust produced by the engine divided by the product of mass flow rate of air through the fan bypass section, the fan tip diameter and the rotational speed of the power turbine section, as set out in Equation 1.

$$\text{Engine Unit Thurst Parameter} = \frac{\text{Net Thrust of the Engine}}{[(\text{mass flowrate of air through fan bypass})(\text{Fan Tip Diameter})(\text{Speed of the power turbine})]} \quad \text{Equation 1}$$

The EUTP is a dimensionless quantity calculated utilizing the net engine thrust, the mass flow rate of air, the tip diameter and the power turbine rotational speed expressed in appropriate units. For example, if the SI system of units is used, the units for these four quantities will be N, kg/s, m and radians/s, respectively. The calculation of the EUTP will be straight forward with no need to use conversion factors. If a "customary" set of units are used, i.e., engine thrust expressed in lbf, mass flow rate expressed in lbm/s, fan diameter express in inches and rotational speed expressed in RPM, then the ratio calculated using these values are multiplied by constant approximately equal to 3686.87 to account for all conversion factors necessary to get all parameters in self-consistent units.

Embodiments of the geared gas turbine engine 20 including the disclosed features and configurations produce thrust ranging between about 16,000 lbf (71,171 N) and about 120,000 lbf (533,786 N). The EUTP for the disclosed turbofan engine 20 is less than those provided in prior art turbine engines. Three disclosed exemplary engines which incorporate power turbine and propulsor sections as set forth in this application are described and contrasted with prior art engine examples in Table 1.

TABLE 1

|  |  | Engine 1 | Engine 2 | Engine 3 | Prior Art Engine 1 | Prior Art Engine 2 |
| --- | --- | --- | --- | --- | --- | --- |
| Fan Diameter | in | 55.9 | 73.0 | 81.0 | 63.5 | 49.2 |
| Thrust Class Max Climb | lbf | 17K | 23.3K | 33K | 33K | 21K |
| Thrust | lbf | 3526 | 4878 | 6208 | 9721 | 8587 |
| Fan face corr. Flow | lbm/sec | 703.4 | 1212.1 | 1512.4 | 847.0 | 502.6 |
| Fan OD corr. Flow | lbm/sec | 626.3 | 1108.8 | 1388.6 | 696.4 | 314.2 |
| Fan face physical flow | lbm/sec | 261.5 | 450.6 | 561.7 | 519.4 | 308.8 |
| Fan OD physical flow | lbm/sec | 232.7 | 412.1 | 515.6 | 426.9 | 193.1 |
| Second speed (fan) | RPM | 4913 | 3377 | 3099 | 4969 | 7640 |
| First speed (power turbine) | RPM | 11835 | 10341 | 9491 | 4969 | 7640 |
| Engine Unit Thrust Parameter |  | 0.08 | 0.06 | 0.06 | 0.27 | 0.44 |

TABLE 1-continued

|  |  | Engine 1 | Engine 2 | Engine 3 | Prior Art Engine 1 | Prior Art Engine 2 |
|---|---|---|---|---|---|---|
| Average Cruise |  |  |  |  |  |  |
| Thrust | lbf | 2821 | 3929 | 4729 | 5300 | 4141 |
| Fan face corr. Flow | lbm/sec | 668.3 | 1157.6 | 1429.4 | 845.6 | 490.5 |
| Fan OD corr. Flow | lbm/sec | 598.0 | 1065.6 | 1322.6 | 695.5 | 312.1 |
| Fan face physical flow | lbm/sec | 254.1 | 440.2 | 543.4 | 327.4 | 181.1 |
| Fan OD physical flow | lbm/sec | 227.3 | 405.2 | 502.7 | 269.2 | 115.2 |
| Second speed (fan) | RPM | 4472 | 3070 | 2748 | 4769 | 6913 |
| First speed (power turbine) | RPM | 10774 | 9402 | 8416 | 4769 | 6913 |
| Engine Unit Thrust Parameter |  | 0.08 | 0.05 | 0.05 | 0.24 | 0.39 |
| Max Takeoff |  |  |  |  |  |  |
| Thrust | lbf | 12500 | 18735 | 25678 | 25382 | 17941 |
| Fan face corr. Flow | lbm/sec | 610.0 | 1032.5 | 1438.8 | 871.1 | 496.6 |
| Fan OD corr. Flow | lbm/sec | 546.6 | 948.5 | 1330.2 | 711.8 | 312.1 |
| Fan face physical flow | lbm/sec | 611.0 | 1029.4 | 1452.2 | 901.5 | 509.4 |
| Fan OD physical flow | lbm/sec | 547.4 | 945.6 | 1342.4 | 736.1 | 320.2 |
| Second speed (fan) | RPM | 4689 | 3249 | 3117 | 5411 | 7791 |
| First speed (power turbine) | RPM | 11295 | 9951 | 9546 | 5411 | 7791 |
| Engine Unit Thrust Parameter |  | 0.13 | 0.10 | 0.09 | 0.37 | 0.54 |

In some example embodiments, the EUTP is as low as 0.05 at a cruise condition and less than about 0.10 at maximum takeoff thrust. In another engine embodiment including a fan tip diameter greater than about fifty (50) inches the EUTP is less than about 0.30 at maximum takeoff thrust. In another engine embodiment including the fan tip diameter greater than about fifty (50) inches, the EUTP is less than about 0.25. In still a further engine embodiment including a fan tip diameter greater than about fifty (50) inches, the EUTP is less than about 0.20.

In a further embodiment, the EUTP is less than about 0.08 at a cruise and/or a climb condition. In one engine embodiment including a fan tip diameter greater than about fifty (50) inches, the EUTP is less than about 0.15 at a cruise and/or climb condition. In another engine embodiment including a fan tip diameter of greater than about fifty (50) inches, the EUTP is less than about 0.125 at a cruise and/or climb condition.

Moreover, the EUTP is accomplished through the use of the geared architecture 48 at a gear ratio of, in some embodiments, greater than about 2.3. In other embodiments, the gear ratio may be greater than about 2.8. Accordingly, a ratio of the EUTP to the gear ratio further defines physical operating characteristics of the disclosed engines. In one disclosed embodiment, a ratio of the EUTP at takeoff to a gear ratio of 2.8 is about 0.028. In another disclosed ratio of the EUTP at a climb or cruise condition to the gear ratio of 2.8 is between about 0.036 and 0.054.

Accordingly, the EUTP for engines based upon the disclosed features may be less than 0.30 when the engine is operating at takeoff condition, while it may have a value less than 0.1 when operating at climb and cruise conditions.

Accordingly, the disclosed embodiments of each of the gas generator 62, power turbine 76 and propulsor sections 64 of the geared engine embodiments efficiently convert energy to provide a more thrust efficient turbofan engine as compared to conventional non-geared engines.

Although various example embodiments have been disclosed, a worker of ordinary skill in this art would recognize that certain modifications would come within the scope of this disclosure. For that reason, the following claims should be studied to determine the scope and content of this disclosure.

What is claimed is:

1. A turbofan engine comprising:
   a propulsor section including a fan and a core flow path portion, the fan including less than 26 fan blades with each fan blade having a fan tip diameter greater than 50 inches and less than 160 inches, wherein the fan rotates in operation at a fan tip speed less than 1150 ft/sec;
   a power turbine including between 3 and 6 stages;
   a gas generator section including the core flow path portion of the propulsor, a low pressure compressor, a high pressure compressor, a combustor, a high pressure turbine, and a part of the power turbine, the gas generator having an overall pressure ratio in operation between airflow entering the gas generator and a gas stream exiting from the gas generator that is between 40 and 80; and
   a speed reduction device in driving connection to the power turbine and the fan, the speed reduction device including a speed reduction of greater than 2.3, wherein an Engine Unit Thrust Parameter ("EUTP") defined as net engine thrust divided by a product of the mass flow rate of air through a bypass flow path, a tip diameter of a fan and a first rotational speed of the power turbine in operation is less than 0.30 at a maximum takeoff thrust, wherein the net engine thrust is between 16,000 lbf and 120,000 lbf, the mass flow rate of air through the bypass flow path is between 625 lbm/sec and 80,000 lbm/sec and the first rotational speed is between 6,200 rpm and 12,500 rpm.

2. The turbofan engine as recited in claim 1, wherein the fan includes less than 20 fan blades.

3. The turbofan engine as recited in claim 2, wherein the gas generator section includes a two stage high pressure turbine.

4. The turbofan engine as recited in claim 3, wherein the EUTP in operation at the maximum takeoff thrust is less than 0.25.

5. The turbofan engine as recited in claim 4, wherein the EUTP in operation at a cruise condition is less than 0.10.

6. The turbofan engine as recited in claim 5, wherein the EUTP in operation at a climb condition is less than 0.10.

7. The turbofan engine as recited in claim 6, wherein the EUTP in operation at a climb condition is less than 0.08.

8. The turbofan engine as recited in claim 7, wherein the EUTP in operation at a cruise condition is less than 0.08.

9. The turbofan engine as recited in claim 6, further comprising a low fan pressure ratio across the fan alone that is less than 1.45 in operation, and the EUTP in operation at the maximum takeoff thrust is less than 0.10.

10. The turbofan engine as recited in claim 7, wherein the EUTP in operation at the maximum takeoff thrust is less than 0.15.

11. A turbofan engine comprising:
a propulsor section including a fan and a core flow path portion, the fan including a fan tip diameter greater than 50 inches and less than 160 inches;
a power turbine;
a gas generator section including the core flow path portion of the propulsor, a low pressure compressor, a high pressure compressor, a combustor, a high pressure turbine, and a part of the power turbine, the gas generator having an overall pressure ratio in operation between airflow entering the gas generator and a gas stream exiting from the gas generator that is between 40 and 80; and
a speed reduction device in driving connection to the power turbine and the fan, wherein the speed reduction device includes a speed reduction of greater than 2.3, wherein an Engine Unit Thrust Parameter ("EUTP") defined as net engine thrust divided by a product of a mass flow rate of air through a bypass flow path, a tip diameter of the fan and a first rotational speed of the power turbine in operation is less than 0.25 at a sea-level takeoff power condition, wherein the net engine thrust is between 16,000 lbf and 120,000 lbf, the mass flow rate of air through the bypass flow path is between 625 lbm/sec and 80,000 lbm/sec and the first rotational speed is between 6,200 rpm and 12,500 rpm.

12. The turbofan engine as recited in claim 11, wherein the EUTP at the sea-level takeoff power condition is less than 0.20.

13. The turbofan engine as recited in claim 12, wherein the EUTP in operation at one of a climb condition and a cruise condition is less than 0.10.

14. The turbofan engine as recited in claim 12, further comprising a low fan pressure ratio across the fan alone that is less than 1.45 in operation.

15. The turbofan engine as recited in claim 12, wherein a ratio between a number of fan blades and a number of rotors in the power turbine is between 3.3 and 8.6.

16. The turbofan engine as recited in claim 13, wherein the EUTP in operation at both of a climb condition and a cruise condition is less than 0.08.

17. The turbofan engine as recited in claim 13, wherein the EUTP in operation at the cruise condition is less than 0.08.

18. The turbofan engine as recited in claim 13, wherein the EUTP in operation at the sea-level takeoff power condition is less than 0.15.

19. The turbofan engine as recited in claim 10, wherein a ratio between the number of fan blades and a number of rotors in the power turbine is between 3.3 and 8.6.

20. The turbofan engine as recited in claim 19, wherein the EUTP in operation at the sea-level takeoff power condition is less than 0.10.

21. The turbofan engine as recited in claim 20, including a two stage high pressure turbine.

22. The turbofan engine as recited in claim 17, wherein the fan rotates at a fan tip speed less than about 1150 ft/sec in operation, and the high pressure turbine comprises a two stage high pressure turbine.

23. The turbofan engine as recited in claim 22, wherein the EUTP in operation at the sea level takeoff power condition is less than 0.10.

24. The turbofan engine as recited in claim 23, wherein a ratio between a number of fan blades and a number of rotors in the power turbine is between 3.3 and 8.6.

25. The turbofan engine as recited in claim 24, further comprising a low fan pressure ratio across the fan alone that is less than 1.45 in operation and wherein the number of fan blades is less than 20.

26. The turbofan engine as recited in claim 25, wherein the speed reduction device is a planetary gear system.

* * * * *